May 22, 1951 C. F. TAYLOR 2,554,225

CALIBRATION OF PHOTOVOLTAIC CELLS

Filed Nov. 26, 1949

Inventor:
Clement F. Taylor,
by Russell A. Warner
His Attorney

Patented May 22, 1951 2,554,225

UNITED STATES PATENT OFFICE 2,554,225

CALIBRATION OF PHOTOVOLTAIC CELLS

Clement F. Taylor, Peabody, Mass., assignor to General Electric Company, a corporation of New York Application November 26, 1949, Serial No. 129,578

6 Claims. (Cl. 250—212)

Figures 1, 2, 3, 4, 5, 6:
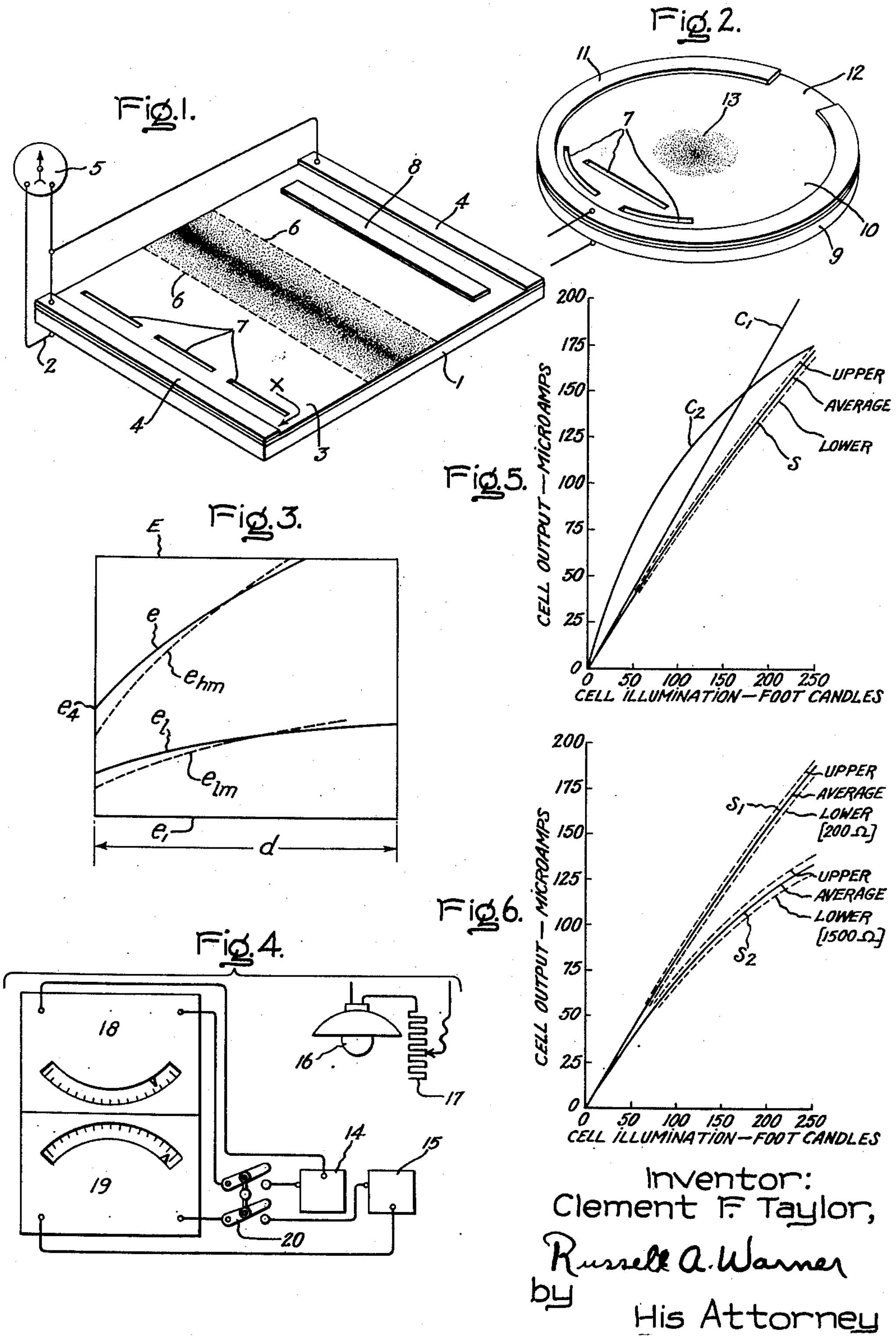

My invention relates to photovoltaic cells and a method of adjusting their characteristics. One object of my invention is to provide a simple method of adjustment of a large number of cells so that they will have the same desired output characteristics, corresponding for example to a particular scale calibration of the light or exposure meters with which they are to be used. In has been discovered that at high illumination the central portion of a photovoltaic cell, that is, the portion farthest removed from the terminal or terminals, is relatively inactive, and that the area close to the terminals contributes appreciably greater current at high illumination, while at low illumination the entire area of the cell is uniformly active in contributing current. I make use of this discovery in my calibrating method by selectively masking or otherwise reducing the cell activity at selected portions, depending upon the characteristics desired. For instance, if I wish to reduce the cell output at low illumination, I reduce the activity at the center portion of the cell and if I wish to reduce the cell output at high illumination, I reduce the activity near the terminal strip or strips. In this way cells which would otherwise have different illumination-current output characteristic curves can all be adjusted to be similar in this respect.

The features of my invention which are believed to be novel and patentable will be pointed out in the claims appended hereto. For a better understanding of my invention, reference is made in the following description to the accompanying drawing in which Fig. 1 illustrates the structure of a rectangular photovoltaic cell of a type to which my invention is applicable, and the application of my invention thereto. Fig. 2 represents a circular cell, and the application of my invention thereto. Fig. 3 shows voltage distribution curves of cells at different illuminations explanatory of my invention. Fig. 4 shows cell calibration apparatus and Figs. 5 and 6 show calibration light intensity-current output curves of photovoltaic cells to be referred to in explaining my invention.

Referring now to Fig. 1, I have here represented a photovoltaic cell of rectangular shape which may consist of an iron backing plate 1 forming one electrode to which one output terminal 2 is connected. Deposited on this plate is a layer 3 of selenium or other light sensitive material, and at two opposite edges terminal strips 4 of conductor material are secured to the exposed surface 3 and together constitute the other terminal of the cell. Photovoltaic cells may be made of different materials and by various methods, undergo various curing processes, and vary in construction. For instance, the cell described may have a barrier layer between the selenium surface 3 and metal backing plate 1, and may have a transparent protective coating over its exposed surface, and may be placed in a hermetically sealed enclosure. My invention does not pertain to such details of construction but to cell calibration after construction, and is applicable to photovoltaic cells generally which, when exposed to light, will produce a voltage between back plate 1 and the upper surface of the light responsive coating 3 such that output terminals and a measuring circuit may be connected thereto and the voltage measured by a sensitive measuring instrument 5 as represented in Fig. 1. The voltage produced and the current which will flow in the measuring circuit are proportional to the illumination intensity to which the surface 3 of the cell is exposed, and such cells are used in exposure and light meters. It so happens that cells which are made alike, so far as that is possible, do not always have the same illumination intensity-volt-ampere output characteristics. This may be due to a variety of causes which are difficult exactly to control in the process of manufacturing and curing the cells, and it is the purpose of my invention to provide a method of calibration of such cells so that their illumination intensity-output characteristics will substantially match, to the end that the scales of the light or exposure meters with which to be used may all be made alike, or so that one cell may be exchanged for another cell without the necessity of other recalibration in order to obtain substantially accurate measurement results.

I have found by experiment that the masking of a photovoltaic cell in the region most remote from its sensitive surface terminal or terminals, such as the terminal strip 4, Fig. 1, has a reduced effect on the output at high illumination intensities. Thus, at 500 footcandle illumination intensity there will be relatively less change in the cell output due to covering and uncovering the central one-fourth of the surface 3, indicated between the dotted lines 6, by an opaque mask, than would occur for similar operation near a collector strip as 4. This is because that area remote from the terminal strip 4 is relatively less active at high illumination. There are no definite boundary lines, such as the dotted lines 6 of Fig. 1, where this inactivity of the material at high illumination begins or ends, but this characteristic of the material varies in proportion to the distance from the terminals or terminal. Also, it varies with the degree of illumination, becoming less noticeable as the illumination intensity decreases. At low illumination such, for example, as 10 footcandles, the entire area of the cell is uniformly active, and masking the same area at any part of the cell at low illumination will result in a constant and noticeable decrease in output. However, masking the cell near the terminal strips will produce a reduced output which will be most pronounced at high illumination when only the area near the terminal strips is fully active.

I have also found that the output of such cells may be reduced primarily at high illumination by lengthening the average current path in the sensitive surface 3 by cutting slits through such surface across the current paths near the terminals as represented at 7 in Fig. 1. Thus it is evident that the shortest current path from the point represented by X, Fig. 1, to the nearest terminal 4 has been about doubled by cutting the slit 7 between it and such terminal. Cutting such slits does not reduce the optically active area of material 3 which is exposed to light, to any appreciable extent, but it does increase the average length of the resistance path through which current must flow to reach the terminal from the area near the terminal. This expedient is quite effective in reducing the output of the cell at high illumination without much influence on it at low illumination. The greater the length of the cut or cuts 7 across the path of the current, the greater will this effect become. Masking the cell with an opaque piece of tape or other material as represented at 8 near the right terminal of Fig. 1 will reduce the output of the cell at all values of illumination, but will be most effective at high illumination because only the area near the terminals would be otherwise fully active under this condition. Such masking near the terminal increases the average length of the current path from the active material to the terminal primarily with respect to that area of the cell adjacent the terminal. The material 8 may be ordinary stickum paper stuck onto the exposed surface of 3, or onto any transparent covering thereon.

Another practicable way of applying calibrating masking material is to spray such material on the surface to be masked in a liquid form, such as paint. During such spraying, parts other than the part to be masked may be protected by a temporary covering. Using a fine spray, the masking may only partially cover the surface sprayed and in this way the extent of masking may be controlled. The central portion of the cell of Fig. 1 is represented as being partially masked by a paint spray. Instead of cutting slits, such as the slits 7, in the material 3 as a means of adjusting the output characteristics, I may remove a portion of the terminal strip or strips so as to lengthen the current path adjacent thereto. This is shown in Fig. 2 which shows a circular photovoltaic cell. The backing plate is indicated at 9, the photosensitive coating material at 10, and the terminal thereto at 11, consisting of a conductor band deposited about the rim of the active surface of the cell except over the rim section at 12. It will be evident that removing or omitting the terminal strip at 12 will have much the same effect as cutting slits, such as the slits shown at 7, insofar as elongating the current path between the terminal strip 11 and certain areas of the material 10 close to the ends of such terminal. Fig. 2 also shows a very slight masking of the center area of the cell by means of paint sprayed thereon at 13.

It is believed that the behavior of the cells in response to the calibration treatments mentioned above may be explained as follows: When light strikes the cell, a voltage will exist between the activated cell material and the back plate. If the external circuit is open, such voltage level at all parts of the cell will be the same and of a value proportional to the light intensity. Assume the light to be of high intensity this open circuit voltage may be represented by the line E, Fig. 3, where line $e_1$ represents the voltage of the back plate 1. When the external circuit is closed, current will flow therein and the voltage of the light sensitive material terminal, such as terminals 4 of Fig. 1, will be lowered below that of the open circuit voltage. Let distance $d$, Fig. 3, represent the distance from the cell terminal 4 to the material 3 farthest therefrom. When the external circuit is closed, current will flow and the voltage of terminal 4 will drop to some value $e_4$, and the potential gradient from this terminal to the center of the cell may be represented by the curve $e$ due to the combined effects of resistance drop in the surface layer material or materials, and losses due to shunting through the selenium, barrier layer, etc., which current travels directly to the backing plate and is totally lost for external use. Current drains from the area closest to the terminal, and the potential drop towards the terminal in this area is considerable, while near the center of the cell there is little if any potential drop. The shunting resistance is a function of light intensity, diminishing as illumination increases. The shunted current increases with intensity, voltage and distance from a terminal. Hence, at high illumination the center part of the cell remote from terminal 4 contributes current in reduced proportions and it does not greatly influence the output of the cell if this area is masked.

At low illumination and without any calibration treatment, the potential gradient from the center of the cell to the terminal may be represented by curve $e_l$. The current density near the terminal is much lower, the voltage drop in this vicinity is relatively low, and the shunt resistance is high so that a potential drop exists to that material farther from the terminal and it will contribute appreciable current. If, however, the material farthest from the terminal be masked as in Fig. 1, the voltage gradient will change so as to be represented by curve $e_{lm}$, thus showing that masking the material remote from the terminal reduces output at low illumination only. It should be observed that with respect to curve $e_{lm}$ the material beyond the right end of such curve is masked and hence inactive even at low illumination.

Cutting slits 7 or masking the material near the terminal or terminals as at 8 in Fig. 1 will modify the high illumination curve $e$ by making the voltage drop near the terminals higher as represented by dotted line curve $e_{hm}$, and increasing the effect of the shunting resistance and hence, will reduce the output at high illumination levels. However, at low illumination when the current density near the terminals is low and the shunt resistance high, the last-mentioned calibration expedient will not have much effect, particularly the cutting expedient 7.

One suitable apparatus set up for calibrating cells is represented in Fig. 4 where 14 may represent a standard cell having the desired characteristics and 15 a cell to be calibrated so as to match the characteristics of cell 14. These cells are placed under a light source 16 so as to be equally illuminated thereby. Means are provided, such as the adjustable resistance 17, to vary the value of the illumination provided by light source 16. At 18 and 19 are provided two sensitive microammeters known to have exactly similar characteristics and scale distributions with their scales closely adjacent each other for easy visual comparison. It is assumed that both instruments deflect in the same direction, or to the right as viewed in the illustration. Instrument 18 is connected to measure the output of standard cell 14, and instrument 19 is connected to measure the output of the cell to be calibrated 15. The scales of the instruments may be calibrated in microamperes, candlepower, or other convenient units.

A two-pole switch 20 with a pole in each instrument circuit may be included. In calibrating calls, the calibration should be with the same external load resistance which is to be used in practice. Thus, if the external load resistance is to be 500 ohms, the voltmeter circuits should be 500 ohms either in the coils or in the coils and additional resistances in their circuits. Also, a standard cell 14 should be selected which has an output which is generally lower than the average cell to be calibrated, since the matching method involves lowering the output either at high illumination or low illumination, or both, of the cells to be calibrated, where any adjustment is required.

The switch 20 is closed and the rheostat 17 varied, and the cell outputs compared over the desired illumination range. Assume now that the calibration of the standard cell 14 is that corresponding to curve S, Fig. 5. Such calibration may have been arrived at by the method described or by selecting a cell having the desired characteristics without adjustment.

Assume the first cell 15 to be matched with 14 has characteristics corresponding to curve $C_1$. It is noted that its output is high, particularly at high illumination. Hence, this cell needs adjustment by inserting one or more cuts, such as 7, near its terminals, or otherwise reducing the output at high illumination levels by one of the other expedients described. Before cell adjustment the instrument pointers will have positions somewhat like that represented in Fig. 4 at high illumination, for example, 250 footcandles. A short cut 7 is now made in cell 15 near its terminal, and its effect is noted by a reduced deflection of instrument 19. If this is insufficient, another cut is made or the first cut is elongated, and such cutting is continued until the two instruments give the same deflection. Such cutting preferably should be distributed adjacent the active material terminal or terminals of cell 15 to obtain reasonable symmetry of the cell. The output at low illumination is then checked and if the output of cell 15 remains high at low illumination, it is reduced by the necessary masking at the center portion of the cell remote from the terminals. I may proceed in the opposite direction for convenience. That is, adjust first for low illuminations and then for high. A small amount of masking of the cell remote from the terminals will not greatly change the high illumination output. The cell 15 is now replaced by the next cell to be calibrated. Suppose such cell is found to have a calibration curve such as curve $C_2$, Fig. 5. This cell has high output at low illumination and is corrected by masking that portion of the cell remote from the terminals. The illumination supplied by lamp 16 is adjusted to a low value, such as 50 footcandles, and the deflection of instrument 19 reduced as by spraying paint on the center portion of the cell under test until the deflection of instrument 19 corresponds to that of instrument 18. This will lower the low illumination part of curve $C_2$, and this change will progressively decrease for higher illumination values and have a negligible effect at full illumination. To bring the upper part of curve $C_2$ down slightly, the central masking can be made less dense and extend over a greater area, shading it off towards the terminals. After the operator has gained a little experience, most cells can be matched quickly and quite accurately after the operator has made a quick comparison of the instrument deflections at low, high, and medium illumination points by adjustment of rheostat 17. Also, any cell that cannot be matched is quickly detected.

If a cell is found which before treatment as herein explained has an output that falls below the curve S, it is discarded for the 500-ohm load circuit group, as it cannot be matched with curve S. It may, however, be matched with some lower output standard cell and probably for some other load resistance use. Likewise, when a cell is found which has a substantially higher output as compared to curve S at all illumination values, it may be transferred to another group of cells which are to be matched with a higher standard output cell or different load resistance for which it is best suited. Thus the apparatus of Fig. 4 lends itself not only to matching of cells but also to the sorting of cells into groups to be later calibrated for a use for which best suited.

The dotted line curves closely adjacent curve S, Fig. 5, represent upper and lower deviations of the characteristics of 18 cells which have been matched in accordance with the method described for a load resistance of 500 ohms. In Fig. 6, the curves at $S_1$ represent the standard and deviations for these same 18 cells for 500-ohm load but measured for a 200-ohm load resistance, and the curves at $S_2$ represent the standard and deviations for the 18 cells for a load output resistance of 1500 ohms. It is probable that the method becomes less sensitive as the external load resistance increases in comparison to the internal resistance of the cells being matched. It is, however, important to note that having matched at a given load (500 ohms), the characteristics are fairly well matched for a wide range (200–1500 ohms) load.

It is contemplated that the sorting and matching of cells according to the method described may be carried out in a large measure as a continuous process by automatic machinery controlled by the comparison measurements obtained at different illumination values.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The method of reducing the ratio of high illumination output to low illumination output of photovoltaic cells which consists in increasing the average length of the current path from the active photosensitive material of the cell to an output terminal thereon, such increase in length of the current path being made adjacent to as distinguished from remote from such terminal whereby the activity of the photosensitive material lying adjacent to such terminal is reduced at high illumination in relation to its activity at low illumination.

2. The method of reducing the ratio of high illumination output to low illumination output of photovoltaic cells which consists in increasing the average length of the current path from the active photosensitive material of such cell to an output terminal thereon, such lengthening of the current path being primarily effective with respect to that area of the cell lying adjacent to such terminal.

3. The method of reducing the ratio of low illumination output to high illumination output of photovoltaic cells which consists in masking only that area of the photosensitive material of the cell lying most remote from a photosensitive output terminal of such cell.

4. The method of adjusting the output of photovoltaic cells which consists in reducing the output at high illumination by increasing the current path from the active photosensitive material of the cell to an output terminal thereon at a point near such terminal, and reducing the output at low illumination by masking a portion of the photosensitive material most remote from such output terminal.

5. The method of reducing the ratio of high illumination output to low illumination output of photovoltaic cells which consists in cutting a slit through the photosensitive material of such cell between a portion of the active area thereof and an output terminal thereon near such terminal, such slit serving to elongate the average current path between the active photosensitive material of the cell and such output terminal.

6. The method of calibrating photovoltaic cells which consists in comparing the output of such cells with the output of a standard photovoltaic cell at high and low illuminations, the cell to be calibrated having in general a higher output than the standard cell prior to calibration, which consists in lowering the output of the cell to be calibrated at high illumination if and as required by slotting through the photosensitive material thereof near an output terminal thereon across the current path therethrough and extending such slotting until the high illumination output of the cell is substantially the same as that of the standard cell, and lowering the low illumination output of the cell to be calibrated if and as required by masking that portion thereof most remote from the output terminal to the extent necessary to reduce its low illumination output to substantially the same as that of the standard cell.

CLEMENT F. TAYLOR.

REFERENCES CITED

The following references are of record in the file of this patent:

Proceedings of the Physical Society, vol. 57, part I, Jan. 1945, #319, pgs. 1 to 11 inclusive.